Feb. 20, 1934.  G. C. COCHRANE  1,948,024
COPYHOLDER
Filed Nov. 26, 1932  7 Sheets-Sheet 1

*Fig.1*

INVENTOR
George C. Cochrane
BY
Russell B Griffith
his ATTORNEY

Feb. 20, 1934.  G. C. COCHRANE  1,948,024

COPYHOLDER

Filed Nov. 26, 1932  7 Sheets-Sheet 4

INVENTOR
George C. Cochrane
BY
his ATTORNEY

Feb. 20, 1934.     G. C. COCHRANE     1,948,024
COPYHOLDER
Filed Nov. 26, 1932     7 Sheets-Sheet 6

INVENTOR
George C. Cochrane
BY
his ATTORNEY

Patented Feb. 20, 1934

1,948,024

UNITED STATES PATENT OFFICE 1,948,024

COPYHOLDER

George C. Cochrane, Rochester, N. Y.

Application November 26, 1932
Serial No. 644,446

20 Claims. (Cl. 120—29)

My present invention relates to copyholders of the general type in which there is provided a support adapted to stand at the rear of a typewriter and embodying a vertically movable copy plate under the control of an operating lever or means at the side of the typewriter whereby the copy plate with holding means for the copy is raised step by step past a line indicator and then dropped to initial position for a repetition of the action after the copied page is turned and a new page presented. The invention has for its object to provide a simple and serviceable copyholder of this character. The improvements are directed in part toward the lifting mechanism for transmitting intermittent elevating impulses to the copy plate; toward the means for releasing and returning the same; toward the provision of a brake mechanism for easing the fall of the copy plate and toward the means for holding and manipulating the note book or other copy that is carried by the copy plate. To these and other ends, the invention resides in certain improvements and combinations of parts, all as will be hereinafter more fully described, the novel features being pointed out in the claims at the end of this specification.

In the drawings.

Similar reference numerals throughout the several views indicate the same parts.

To first give a general idea of the construction and mode of operation of my improved copyholder, it is of the type in which a copy plate to which the note book or other copy is secured is elevated upon a standard with a step by step motion past a stationary line indicator. These elevating impulses are communicated to the copy plate which is adapted to stand at the rear of the typewriter by means of an operating lever disposed at the side of the latter and convenient to the keyboard thereof. When the copy plate has been thus elevated to its full extent, it is returned or dropped for the transcription of the following page of the copy by a special manipulation of the operating lever. A brake device retards its fall to reduce shocks and unnecessary noise. As before stated, my invention is especially concerned with this brake device and with special clutch mechanism whereby the copy plate is so elevated step by step and then dropped.

Figure 1:
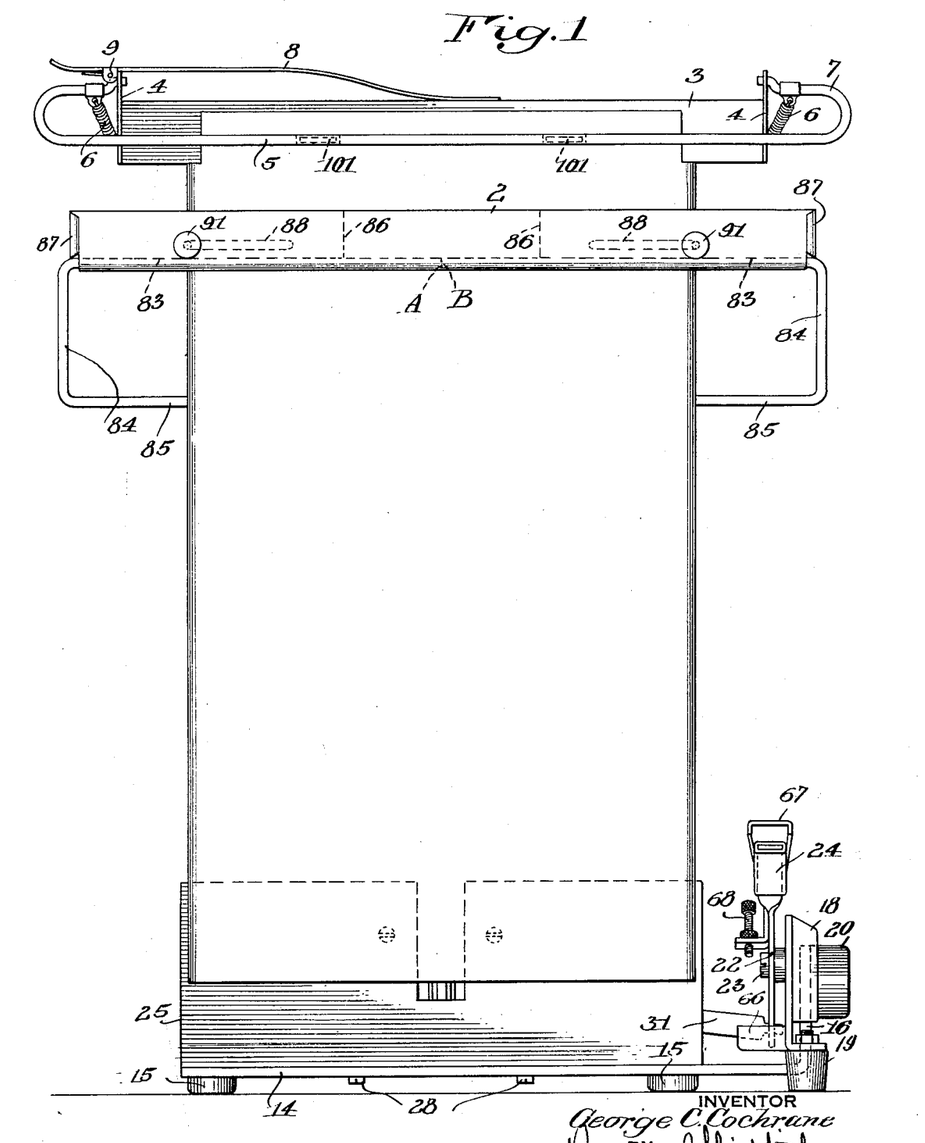
Fig. 1 is a front elevation of a copyholder constructed in accordance with and illustrating one embodiment of my invention.
Figure 2:
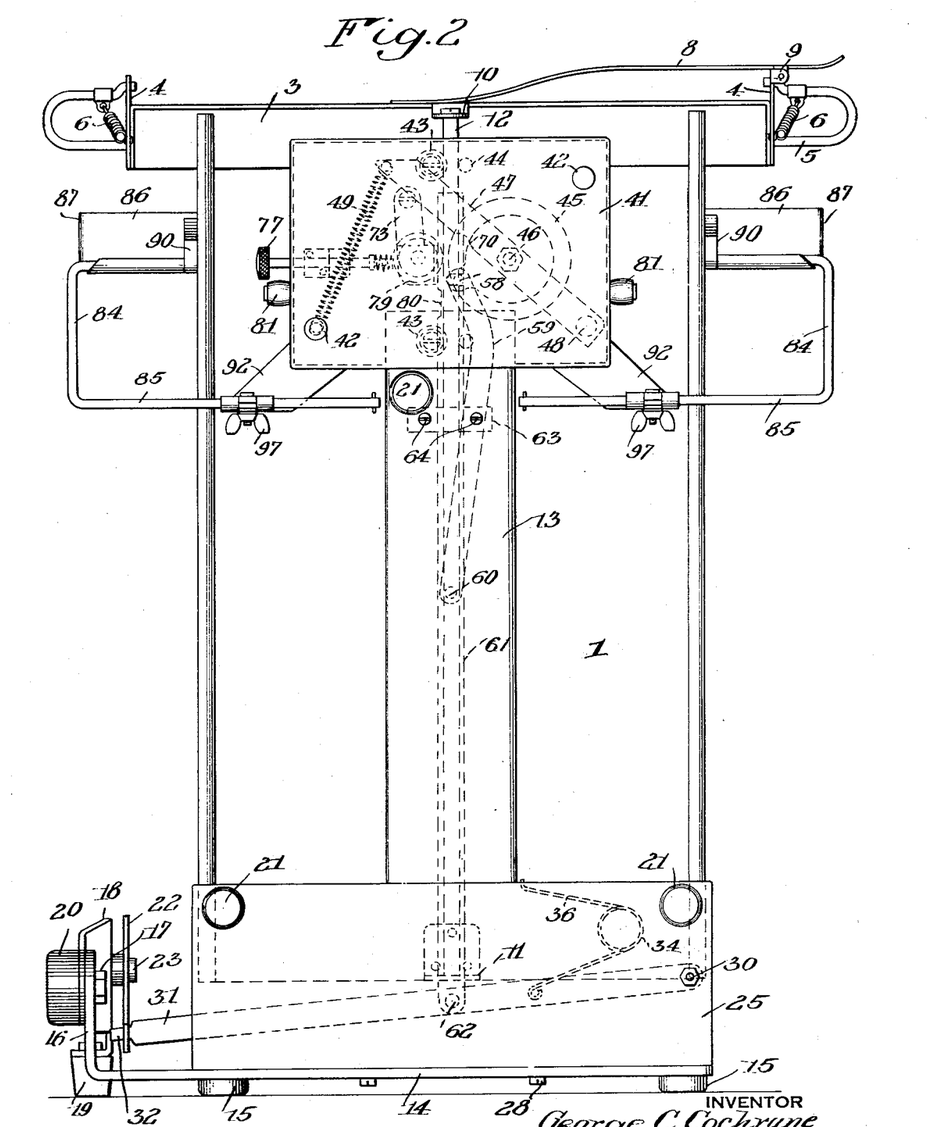
Fig. 2 is a rear elevation thereof with the parts in normal position, including a lowered position of the copy plate.
Figures 4, 5, 6:
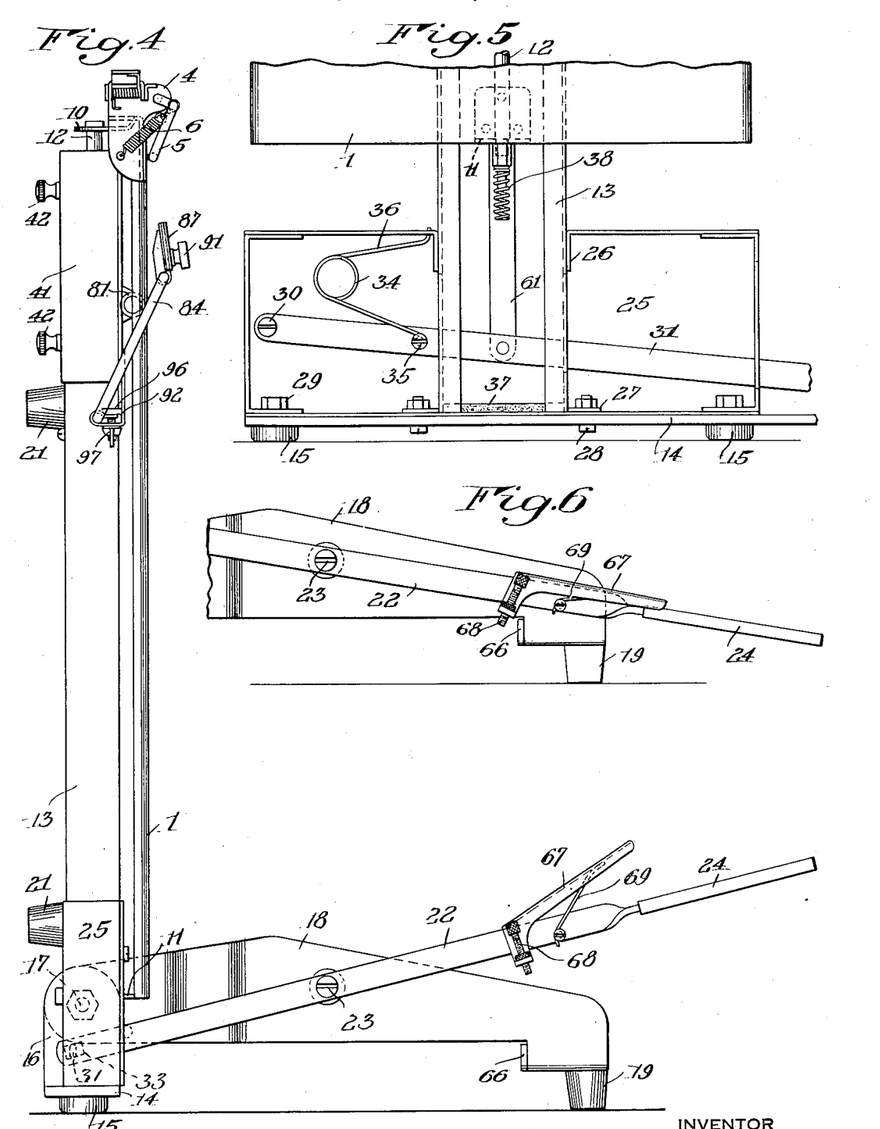
Fig. 4 is a side elevation of the machine taken from the left side of Fig. 1.
Fig. 5 is a fragmentary front elevation of the lower portion of the machine showing the lower end of the copy plate partially raised but with the parts otherwise in normal positions, the front cover plate of the housing of the actuating mechanism having been removed.
Fig. 6 is a fragmentary detail inner side elevation of the side arm of the copy holder showing the manner in which the overthrow of the operating lever for effecting the drop of the copy plate is accomplished, the same being comparative with respect to the showing of Fig. 4.

Referring more specifically to the drawings and first more particularly to Figs. 1, 2 and 4 thereof, 1 indicates the copy plate and 2 the relatively stationary line indicator past which it slides vertically. A cross plate 3 at the top of the copy plate carries at its ends bracket bearings 4 for a copyholding clamp 5 in the present form of a wire yoke or bail that is pressed against the face of the copy plate to support the note book or other copy through the influence of springs 6, the clamp being manipulated by means of the loops 7 at the ends which provide convenient finger pieces. Also mounted on one of the bearing brackets 4 is a spring finger 8 pivoted at 9. This swings in a vertical plane, rests upon the top edge of the copy plate head and is used to hold the turned pages of the copy after the latter have been folded over to hang in rear of the copy plate.

Figures 8, 11, 12, 13:
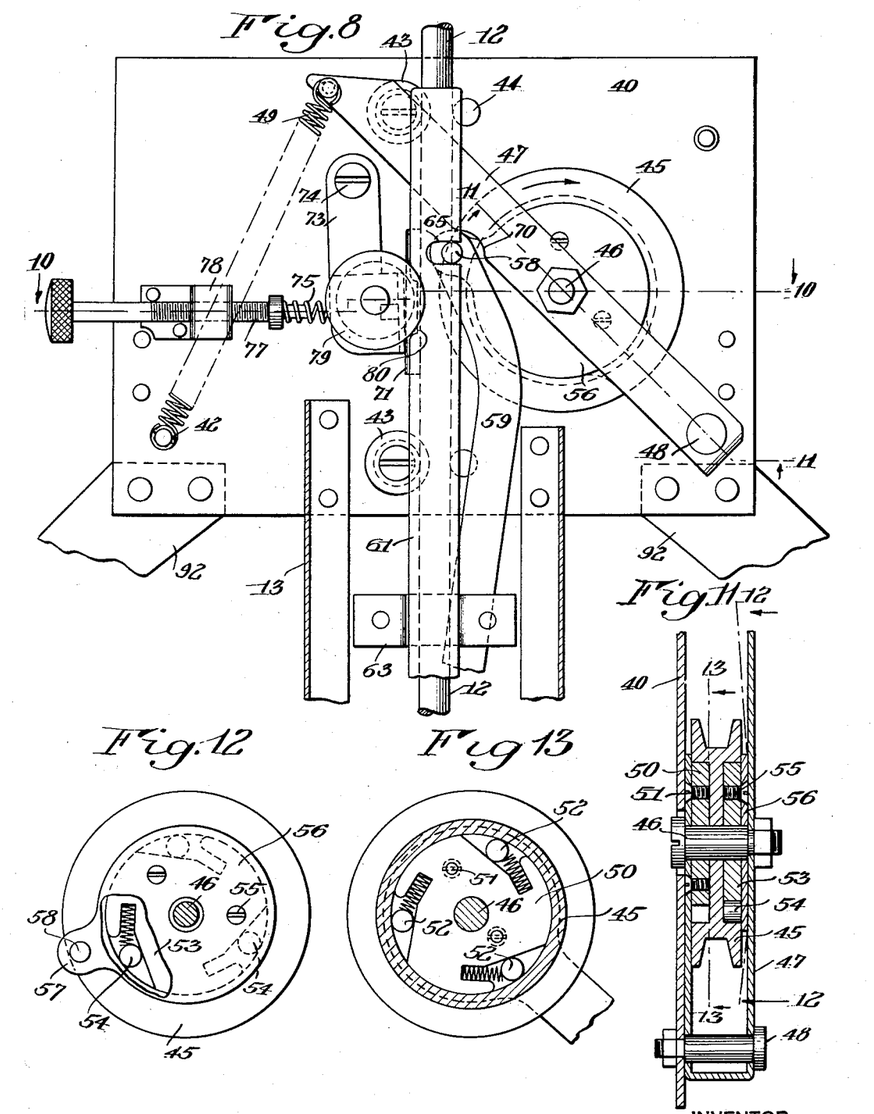
Fig. 8 is a view similar to Fig. 7 but showing the positions of the same parts when the mechanism is operated to cause the descent of the copy plate and the application of the brake mechanism that controls its fall.
Fig. 11 is a detail vertical section taken substantially on the line 11—11 of Fig. 8.
Fig. 12 is a detail section on the line 12—12 of Fig. 11, showing the friction wheel in rear elevation but partly broken away.
Fig. 13 is a similar detail section through the friction wheel taken on the line 13—13 of Fig. 11, showing the holding clutch mechanism thereof.

Top and bottom rearwardly offset brackets 10 and 11 on the copy plate 1 support rigidly a guiding and lifting rod 12 which supports the copy plate generally on a standard 13 rising from a base bar 14 (see also Fig. 5) which rests upon rubber pads 15 so that it is disposed transversely at the rear of the typewriter. An upward extension 16 at one end of this base bar has a pivotal connection 17 with the rear end of a side arm support 18, the forward end of which latter is provided with a rubber foot or pad 19. This pivotal connection at 17 embodies a friction drum 20 which is tight enough to support the machine in the normal positions shown with the standard 13 erect, but when it is desired to fold the machine to a generally flat condition, as for shipping or storage purposes, the side arm 18 may be forcibly folded and swung upon pivot 17 to occupy a position generally in the plane of the copy plate 1 and its standard 13. When so folded, the machine may be laid upon its back and supported by rubber pads 21 appropriately disposed on the standard 13 and connected parts of the frame. The main operating lever of the machine is shown at 22 pivoted at 23 to this side arm 18 and it has an extensible adjustable handle portion 24 at its front end that projects forwardly at the right of the keyboard of the typewriting machine in conjunction with which the copyholder is used.

The frame structure embodying the base bar 14 and standard 13 also comprises a box-like housing 25 at its base, one function of which is to strengthen and render rigid the connection between these parts. Flanges 26 on the top wall of the housing are spot-welded to the sides of the standard, which latter is of the semi-tubular or channel shape shown by comparison of Figs. 2 and 5. Foot flanges 27 on the standard are secured to the base bar 14 by bolts 28, which also secure the latter to the housing, together with bolts 29 that fasten the pads 15. Pivoted in the housing at 30 is a transverse actuating lever 31 that projects at the right through a slot in the housing. This projecting end is reduced at 32 to engage loosely but pivotally in an opening in the rear end of operating lever 22, indicating in dotted lines at 33 in Fig. 4. It is thus obvious that depression of the forward end of the operating lever 22 raises the actuating lever 31 from the normal positions shown. The levers are restored by a hairpin spring 34 in the base housing 25, one arm of which engages the actuating lever at 35 and the other arm 36 of which is anchored in an opening in the top wall of the housing. At the base of the standard 13 is a shock absorbing pad 37 adapted to be engaged by a coiled spring 38 on the lower projecting end of lifting rod 12 to absorb extreme shocks when the plate for any reason falls more heavily than usual.

Figure 3:
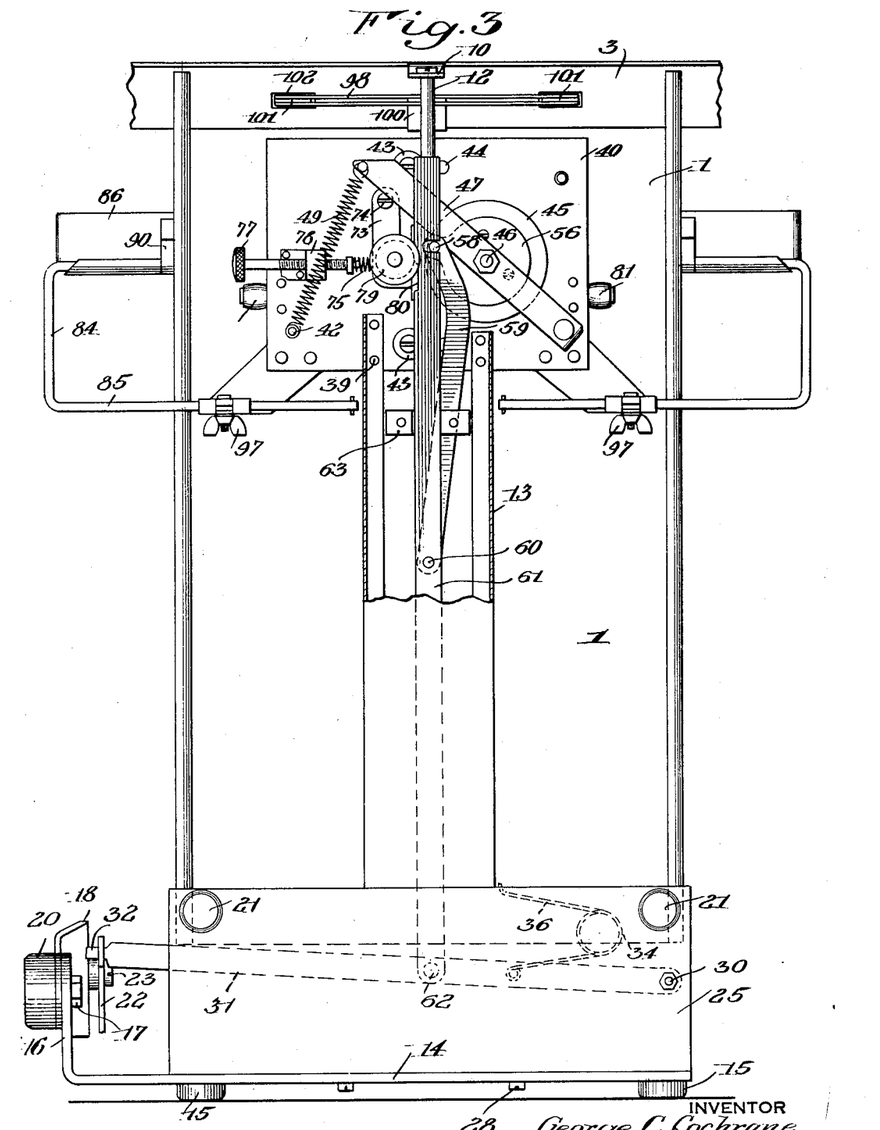
Fig. 3 is a view similar to that of Fig. 2 but with the cover plate of the copy plate lifting mechanism removed and the parts shown in positions occupied when the operating lever is depressed to give an elevating actuation of the cover plate.

I will now describe the clutch mechanism by means of which the copy plate is controlled through the operating and actuating levers 22 and 31, just described. At the top of the standard 13, there is secured thereto as by the rivets 39 (Figs. 3 and 8) a mounting plate or head 40 having a cover plate 41 detachably secured thereto by thumb bolts 42 to provide a housing for the clutch mechanism through which the lifting rod 12 extends. The latter travels on grooved guide rollers 43 turning on the plate 40 with which it is held engaged from the opposite side by guide pins 44, these devices being arranged in pairs at the top and bottom of the plate. At a point intermediate to such pairs of guides, the lifting rod is engaged on the side opposite the rollers 43 by a grooved friction wheel 45 having a bearing on a stud bolt 46 connecting the arms of a yoke 47 pivoted at 48 to the plate 40. The outer free end of the yoke is connected by a spring 49 with thumb bolt 42 to normally hold it under tension with the wheel 45 in effective frictional engagement with the lifting rod 12. In a cavity in the front face of the friction wheel (see Figs. 11 to 13) is a clutch disk 50 secured to one of the yoke arms by screws 51. It is an ordinary roller clutch that requires no detailed description, the spring pressed rollers 52 thereof wedging in their chambers to prevent the friction wheel 45 from turning in a counterclockwise direction but yielding for its movement in the opposite direction, clockwise. The purpose of this clutch is to sustain the lifting rod and copy plate normally in any position to which it is raised.

On the opposite or rear side, the friction wheel 45 is provided with a similar cavity in which is rotatably mounted upon stud 46 (in contra-distinction to the fixed holding clutch disk 50) a lifting clutch disk 53 of a similar character and provided with clutch rolls 54 acting in the same manner. They are also similarly disposed so that when the disk is turned in a clockwise direction they lock with the friction wheel 45 and turn it in the direction of the arrow in Fig. 8 but allowing the disk to return independently of the friction wheel while the latter is held by the lifting clutch 50. It is in this way that the copy plate is lifted step by step or (with reference to the written copy) line by line past the line indicator 2 at the front as the wheel 45 is intermittently rotated in frictionally locked engagement with the lifting rod through successive rotary impulses communicated to clutch disk 50. These are so communicated in the following manner:

Secured by screws 55 to lifting clutch disk 53 is a plate 56 having an extension 57 carrying a wrist pin 58 forming a pivotal connection therewith for the upper end of a link 59. This link extends down (Fig. 3) into tubular standard 13, where its lower end is pivoted at 60 to an actuating rod 61 also extending vertically through the standard. The lower end of this actuating rod is pivoted at 62 to the actuating lever 31, while near the top of the standard it is guided in a bracket 63 secured to the back face of the latter on the inside by screws 64. A notch 65 in rod 61 accommodates wrist pin 58. Therefore, each depression of the key 24 of operating lever 22 through actuating lever 31 raises the actuating rod 61 a given distance which, through link 59, rotates the friction wheel 45 and lifts the copy plate correspondingly, all parts being returned by spring 34 when the operating lever is released and the copy plate being held raised by the holding clutch 50.

When the copy plate has been raised to its limit or at any intermediate time, it may be dropped or returned through manipulation of the operating lever 22, as follows:

Referring to Figs. 4 and 6, the side arm 18 is provided with an inwardly offset stop 66 normally engaged by a stop lever 67 pivoted on the operating lever 22 adjacent to the key 24 thereof, the stop lever being provided with an adjustable contact member in the present form of a screw 68. This limits the throw of the operating lever to give the desired upward thrust to the copy plate to agree with the spacing of the lines on the copy, a spring 69 being provided on lever 67 to normally retain this relationship. When, however, it is desired to drop or return the copy plate, an abnormal depression of the operating lever 22 is made. This is done by dropping the hand on lever 67 instead of upon key 24, which causes the former to be depressed against the operating lever and throws stop 68 clear of stop 66, as shown in Fig. 6, upon continued movement of the operating lever.

Figure 7:
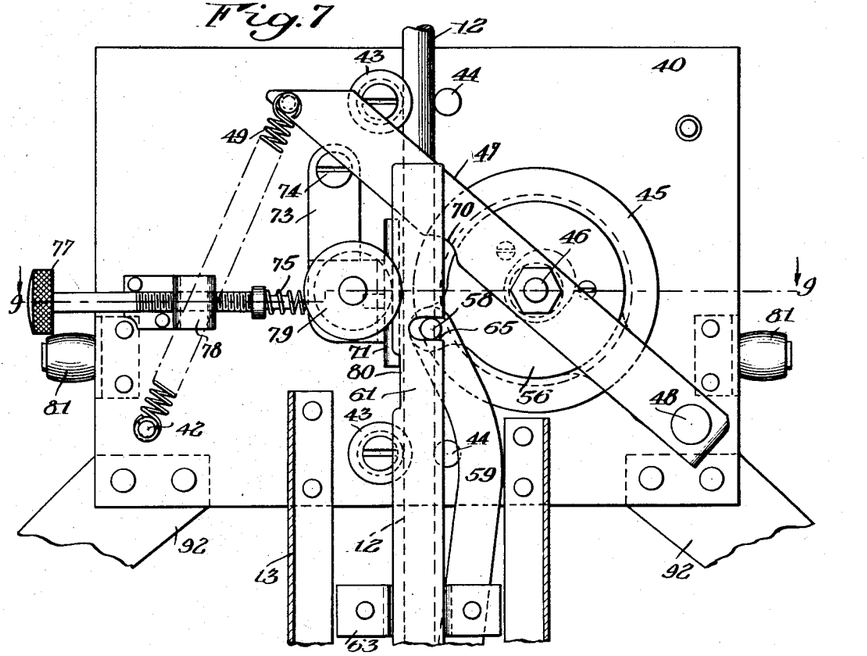
Fig. 7 is an enlarged fragmentary view of the lifting mechanism for the copyholder plate with the parts in the normal position of Fig. 2 but with the cover plate removed so that they appear more generally in full lines.
Figure 9:
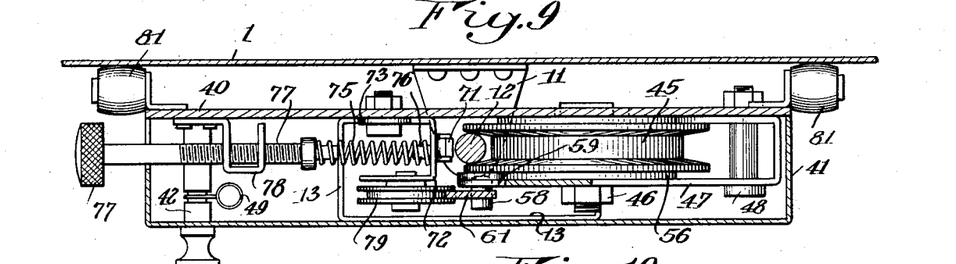
Fig. 9 is a horizontal section taken substantially on the line 9—9 of Fig. 7.
Figure 10:
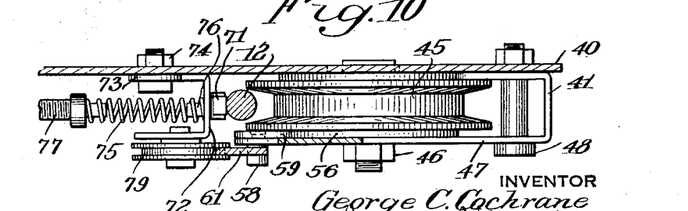
Fig. 10 is another horizontal section taken in the same horizontal plane as that of Fig. 9 but on the line 10—10 of Fig. 8 to show the release of the friction wheel and the application of the brake mechanism, this view being fragmentary, however, with respect to the more complete showing of Fig. 9.

The effect of this is shown in Figs. 7 to 10, of which Figs. 7 and 9 show the normal and lifting positions for the clutch mechanism, where the friction wheel 45 is continuously engaged with the lifting rod. When this abnormal throw of the operating lever occurs resulting obviously in an abnormal throw of actuating rod 61 and link 59, the upper end of the latter strikes a suitably formed surface 70 on the yoke 47 and rocks the latter against the tension of spring 49, as shown in Fig. 8, thus throwing the friction wheel entirely out of contact with lifting rod 12 so that the latter and the copy plate are released entirely from the clutch mechanism and are free to fall so far as this mechanism is concerned. The wheel, of course, goes back into engagement as soon as the operating lever is returned and stays there until the release lever 67 is again operated to permit the overthrow of the operating lever.

As the copy plate 1 is heavy in itself and when loaded with copy is heavier still, it is desirable to provide means for overcoming the inertia of its fall so that its descent will be gradual and noiseless. It is further desirable, however, that this check should not be exerted during the raising of the copy plate, as it would be a similar and unnecessary drag upon the lifting mechanism requiring a greater application of force upon operating lever 22. I have, therefore, devised an automatic brake which applies itself to the lifting rod 12 only when the friction wheel is thrown out upon the abnormal movement of the operating lever to release the copy plate. This brake consists, in the present instance, again referring more particularly to Figs. 7 to 10, of a brake shoe 71 adapted to engage the lifting rod 12 and carried on a yoke 72 at the lower end of a swinging support 73 pivoted at 74 to plate 40. A coil spring 75 centered on a pin 76 on the yoke tends to move the shoe to operative position against the rod, the other end of the spring being centered on a thumb screw 77 threaded through a bracket 78 on plate 40, whereby the tension of the spring may be regulated in accordance with the load. The shoe 71 is normally held in the inoperative position of Figs. 7 and 9 by a grooved wheel 79 pivoted on yoke 72 and riding upon the adjacent edge of the upper end of actuating rod 61. At a lower point, this edge of the rod is notched or cut away at 80 and normally the upward thrust of the rod during the lifting operations is not of sufficient amplitude for the notch 80 to reach the wheel 79. When, however, the abnormal thrust to release the friction wheel is communicated to the lifting rod, the wheel 79 drops into the notch 80 under the influence of spring 75 and the brake shoe 71 goes into operative engagement with the lifting rod at the same time that the friction wheel is thrown out. The thrust of the brake is taken by the guide pins 44 whose contact adds to the friction against the lifting rod, which is the reason that rollers are not provided at this point. Incidentally, these guiding devices 43 and 44 are supplemented, in order to hold the copy plate in a definite plane on the supporting standard, by rollers 81 projecting from the side of plate 40 and bearing against the rear face of copy plate 1.

Returning to the line indicator 2, which has thus far been only generally referred to, means are provided for lengthening this on occasion to take care of copy of unusual width. Referring in this respect more particularly to Figs. 14 and 19 to 22, the said body portion 2 of the indicator has a rolled or beaded lower edge 82 having a frictional bearing on the upper arms 83 of two supporting bails or yokes 84, the lower arms 85 of which are held in clamp bearings hereinafter described. The said friction is sufficient to hold the indicator in a proper adjusted position with reference to the face of the copy as the yokes are swung about the axis 85 according to the thickness of the copy. At each end, an extension 86 having a finger piece 87 for pulling it out is slidable on the body portion 2, being slotted at 88 to take a clamping bolt 89 having a head 90 engaging the extension at the rear and a knurled cap nut 91 at the front (Figs. 15 and 16) engaging the face of the body portion and readily accessible to the operator. When the indicator is to be widened from the position of Fig. 1 to that of Fig. 14, these top nuts are simply loosened and the finger pieces 87 thrust apart. The yokes 85, the ends of which are indicated in dotted lines by the letters A and B in these figures, are drawn out or spread with the extensions 86, as shown also by a comparison of Figs. 2 and 14, because of the nature of the yoke bearings which will now be described.

For each yoke a bracket 92 extends down from plate 40 and has a strap 93 turned over and forming a bearing for the yoke arm 85. At each side of this bearing, the top of the yoke arm is frictionally engaged by a knuckle 94 on a clamping plate 95. A bolt having a head 96 bearing on the plate extends through the latter and through the strap 93 as well as the body of the bracket 92 to be engaged by a wing nut 97. Loosening of this nut permits the yokes to be spread, as described, and normally it is tightened just sufficiently to allow the bails to swing stiffly and support the line indicator as desired without manipulating the nuts on every adjustment.

Figures 14, 15, 16, 17:
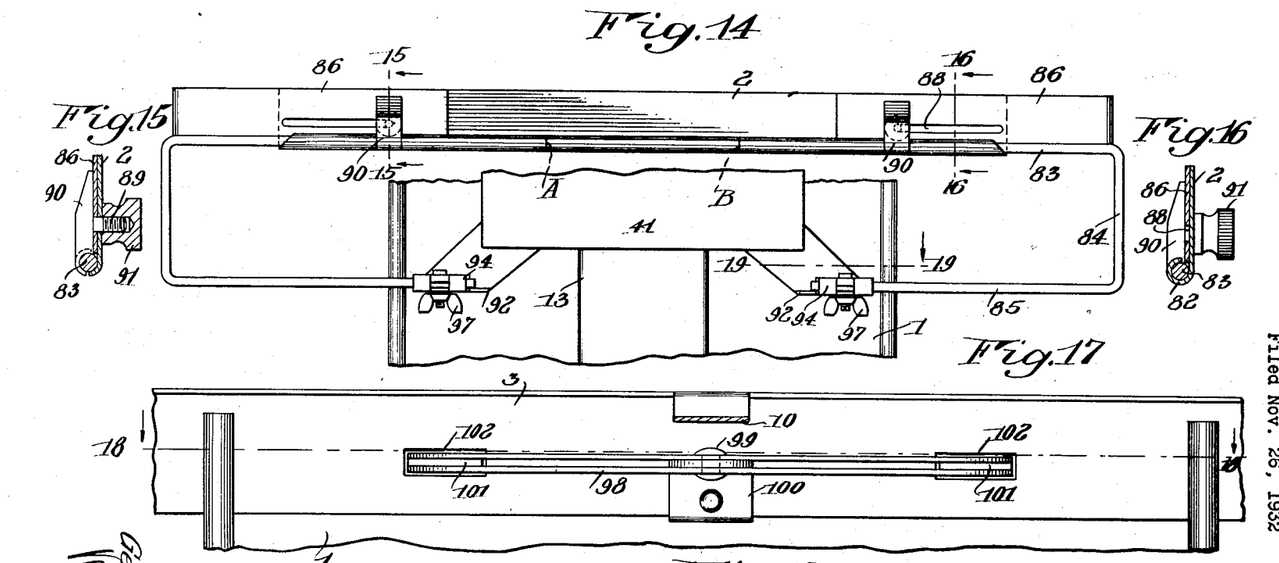
Fig. 14 is a rear elevation of the line indicator extended, together with a fragment of that portion of the copy plate standard in which it has its bearing.
Fig. 15 is an enlarged detail section through the line indicator taken on the line 15—15 of Fig. 14.
Fig. 16 is a similar section taken on the line 16—16 of Fig. 14.
Fig. 17 is an enlarged fragmentary rear elevation of the head piece on the copy plate showing an equalizer for the paper clamp.
Figures 18, 19, 20, 21, 22:
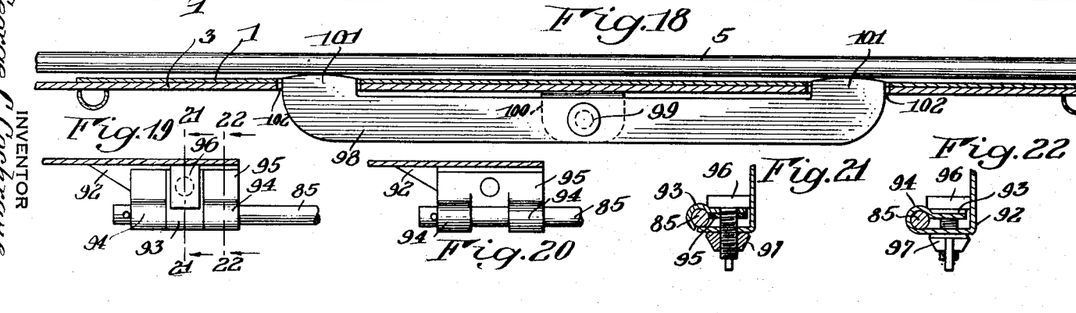
Fig. 18 is a horizontal section taken on the line 18—18 of Fig. 17.
Fig. 19 is an enlarged fragmentary detail section taken on the line 19—19 of Fig. 14, showing a top view of one of the bearing clamps for the line indicator.
Fig. 20 is a similar view of the bearing clamp with some of the parts removed.
Fig. 21 is a section on the line 21—21 of Fig. 19.
Fig. 22 is a section on the line 22—22 of Fig. 19.

Another feature of my invention has reference to the copyholding clamp 5. It has been the practice to thread pieces of rubber tubing on this clamping bail to insure gripping contact at at least two points with very thin copy, such as a single sheet. These become lost or harden with time so that they are ineffective. In lieu thereof, I provide a mechanical equalizer on the copy plate so that gripping contact is assured. This consists, as shown in Figs. 17 and 18, of a bar 98 pivoted at 99 at its center on a bracket 100 on the rear of the copy plate or the head 3 thereof. Two shoes 101 at the ends thereof project through slots 102 in the copy plate slightly beyond the front face of the latter on the line of the clip 5, as shown in Fig. 1, so that an even and positive contact therewith is assured at these two points.

I claim as my invention:

1. In a copyholder, the combination with a standard having guides and a copy plate movable vertically thereon and embodying a lifting rod cooperating with the guides, of a friction wheel mounted on the standard and engaging the rod, and means for imparting intermittent rotary impulses to the wheel in the same direction to lift the copy plate step by step.

2. In a copyholder, the combination with a standard having guides and a copy plate movable vertically thereon and embodying a lifting rod cooperating with the guides, of a friction wheel mounted on the standard and engaging the rod, means for imparting intermittent rotary impulses to the wheel in the same direction to lift the copy plate step by step, and means for displacing the friction wheel bodily from engagement with the rod to permit the copy plate to descend.

3. In a copyholder, the combination with a standard having guides and a copy plate movable vertically thereon and embodying a lifting rod cooperating with the guides, of a friction wheel mounted on the standard and engaging the rod, a lifting clutch within the wheel, and operating mechanism connected with the clutch for imparting intermittent rotary impulses to the wheel in the same direction to lift the copy plate step by step.

4. In a copyholder, the combination with a standard having guides and a copy plate movable vertically thereon and embodying a lifting rod cooperating with the guides, of a friction wheel mounted on the standard and engaging the rod, a lifting clutch within the wheel, operating mechanism connected with the clutch for imparting intermittent rotary impulses to the wheel in the same direction to lift the copy plate step by step, and a holding clutch within the wheel for holding the latter locked with the rod while the lifting clutch is returning to initial position.

5. In a copyholder, the combination with a standard having guides and a copy plate movable vertically thereon and embodying a lifting rod cooperating with the guides, of a friction wheel mounted on the standard and engaging the rod, a lifting clutch within the wheel, operating mechanism connected with the clutch for imparting intermittent rotary impulses to the wheel in the same direction to lift the copy plate step by step, a holding clutch within the wheel for holding the latter locked with the rod while the lifting clutch is returning to initial position, and means associated with the operating mechanism for tripping the holding clutch.

6. In a copyholder, the combination with a standard having guides and a copy plate movable vertically thereon and embodying a lifting rod cooperating with the guides, of a friction wheel mounted on the standard and engaging the rod, a lifting clutch within the wheel, operating mechanism connected with the clutch for imparting intermittent rotary impulses to the wheel in the same direction to lift the copy plate step by step, a holding clutch within the wheel for holding the latter locked with the rod while the lifting clutch is returning to initial position, and means associated with the operating mechanism for tripping the holding clutch, said means embodying an element adapted to successively operate the lifting clutch and to so trip the holding clutch and a displaceable stop for normally halting said means before such tripping of the holding clutch.

7. In a copyholder, the combination with a standard having guides and a copy plate movable vertically thereon and embodying a lifting rod cooperating with the guides, of a friction wheel mounted on the standard and engaging the rod, a lifting clutch within the wheel adapted to lock therewith in one direction, means for imparting intermittent impulses to the clutch to rotate the wheel in one direction and raise the copy plate with a step by step motion, and a holding clutch within the wheel for locking the latter against retrograde movement.

8. In a copyholder, the combination with a standard having guides and a copy plate movable vertically thereon and embodying a lifting rod cooperating with the guides, of a friction wheel normally engaging the rod, a support therefor pivoted to the standard to carry said wheel toward and from the rod, and means for imparting intermittent rotary impulses to the wheel in the same direction to lift the copy plate step by step, said means being operable also to rock the wheel support and carry the wheel away from the rod and permit the descent of the copy plate.

9. In a copyholder, the combination with a standard having guides and a copy plate movable vertically thereon and embodying a lifting rod cooperating with the guides, of a friction wheel normally engaging the rod, a support therefor movable on the standard to carry said wheel toward and from the rod, a lifting clutch within the wheel, operating mechanism connected with the clutch for imparting intermittent rotary impulses to the wheel in the same direction to lift the copy plate step by step, and a holding clutch within the wheel for holding the latter locked with the rod while the lifting clutch and its operating mechanism are returning to initial position, an overthrow of the latter being adapted to displace the wheel support and permit the descent of the copy plate independently of the wheel.

10. In a copyholder, the combination with a standard having guides and a copy plate movable vertically thereon and embodying a lifting rod cooperating with the guides, of a friction wheel normally engaging the rod, a support therefor pivoted to the standard to carry said wheel toward and from the rod, the wheel having cavities in its opposite sides, a lifting clutch disc in one such cavity, a wrist pin connected thereto, a holding clutch within the other cavity secured to the wheel support, said support being movable on the standard to carry said wheel toward and from the rod, and an actuating means connected to the wrist pin for imparting intermittent impulses to the lifting clutch to rotate the wheel in the same direction and lift the copy plate step by step, an overthrow of the actuating means being adapted to displace the wheel support and permit the descent of the copy plate independently of the wheel.

11. In a copyholder, the combination with a standard, a copy plate, guides on the standard, and a lifting rod on the copy plate movable in the guides, of clutch mechanism for elevating the copy plate with a step by step motion, an actuator for said clutch mechanism adapted to also act to release the latter and allow the copy plate to drop, a brake adapted to cooperate with the rod, and means associated with the actuator for modifying the action of the brake upon an unaccustomed movement of the actuator.

12. In a copyholder, the combination with a standard, a copy plate, guides on the standard, and a lifting rod on the copy plate movable in the guides, of clutch mechanism for elevating the copy plate with a step by step motion, an actuator for said clutch mechanism adapted to also act to release the latter and allow the copy plate to drop, and a brake adapted to cooperate with the rod but normally held out of engagement therewith by the actuator, the latter being arranged to release the brake when it is moved to also release the clutch.

13. In a copyholder, the combination with a standard, and a copy plate guided to move vertically thereon, of a lifting clutch and a holding clutch for the copy plate, a spring pressed brake adapted to check the fall of the copy plate when the latter is released from the action of the clutches, and an actuator adapted to release the clutches and, upon a continuation of the same movement, to release the brake.

14. In a copyholder, the combination with a standard, a copy plate, guides on the standard, and a lifting rod on the copy plate movable in the guides, of clutch mechanism for elevating the copy plate with a step by step motion, an actuator for said clutch mechanism adapted to also act to release the latter and allow the copy plate to drop, and a spring pressed brake adapted to engage the lifting rod to retard the fall of the copy plate, said brake normally engaging the actuator and being held thereby out of engagement with the lifting rod.

15. In a copyholder, the combination with a standard, a copy plate, guides on the standard, and a lifting rod on the copy plate movable in the guides, of clutch mechanism for elevating the copy plate with a step by step motion, an actuator for said clutch mechanism adapted to also act to release the latter and allow the copy plate to drop, and a spring pressed brake embodying a shoe adapted to engage the lifting rod to retard the fall of the copy plate and a roller normally engaging the actuator to hold the brake shoe out of such engagement, the actuator being formed to relieve the roller and permit such engagement of the brake shoe upon an abnormal movement of such actuator.

16. In a copyholder, the combination with a standard, a copy plate, and a lifting rod on the latter, of guides on the standard for the lifting rod embodying rollers and means for holding the rod in cooperation therewith, clutch mechanism embodying a friction wheel normally engaging the rod and adapted therethrough to lift the copy plate with a step by step motion, a brake mechanism adapted to engage the rod in opposition to the friction wheel to retard the fall of the copy plate when released, and an actuator for the clutch mechanism arranged to normally hold the brake in inoperative position but to release the same for engagement with the rod upon a movement during which it is also adapted to move the friction wheel out of contact with the rod and permit the descent of the copy plate.

17. In a copyholder, the combination with a standard having guides, and a copy plate provided with a lifting element cooperating with the guides, of clutch mechanism embodying a friction wheel normally engaging the lifting element and adapted therethrough to lift the copy plate with a step by step motion, a brake mechanism adapted to engage the rod to retard the fall of the copy plate when released, and an actuator for the clutch mechanism arranged to normally hold the brake in inoperative position but to release the same for engagement with lifting element upon a movement during which the actuator is also adapted to move the friction wheel out of contact with the lifting element and permit the descent of the copy plate.

18. In a copyholder, the combination with a standard having guides, and a copy plate provided with a lifting element cooperating with the guides, of means cooperating with the lifting element for raising the copy plate step by step and then releasing the same to permit of its descent, a brake adapted to engage the lifting element to retard the fall of the copy plate and embodying a swinging bracket carrying a brake shoe, a spring therefor and means for tensioning the spring, and an actuator associated with the raising means normally acting to hold the brake in inoperative position.

19. In a copyholder, the combination with a copy plate, and a standard having guides thereon in which the copy plate may be raised and lowered, of means embodying an actuator for lifting the copy plate step by step and then releasing the same to permit its descent, and a brake mechanism for retarding the fall of the copy plate, said brake mechanism being held in inoperative position by the actuator during the movements of the latter which effect the raising of the copy plate.

20. In a copyholder, the combination with a standard having guides, a copy plate movable vertically thereon, clutch mechanism for raising the copy plate step by step, actuating mechanism therefor, and means operative upon an abnormal movement of the actuating mechanism for releasing the clutch mechanism to allow the copy plate to descend, of an operating lever embodying a key, a stop for normally limiting the throw of the operating lever, and a second key on said lever for rendering the stop inoperative and permitting an overthrow of the operating lever.

GEORGE C. COCHRANE.